United States Patent [19]
Whitehouse

[11] Patent Number: 5,787,873
[45] Date of Patent: Aug. 4, 1998

[54] RETRO-FIT BARBECUE GRILL DRIVE

[76] Inventor: Jack Whitehouse, 1812 Trinity Ave. #120, Walnut Creek, Calif. 94596

[21] Appl. No.: 764,906

[22] Filed: Dec. 16, 1996

[51] Int. Cl.⁶ .................................................. A47J 37/04
[52] U.S. Cl. .................... 126/25 R; 126/25 AA; 126/41 A; 99/421 V
[58] Field of Search ............... 126/25 AA, 25 R, 126/41 A; 99/421 V

[56] References Cited

U.S. PATENT DOCUMENTS

| | | | |
|---|---|---|---|
| 3,033,189 | 5/1962 | Clark | 126/25 |
| 3,033,190 | 5/1962 | Atkinson | 126/25 AA |
| 3,298,301 | 1/1967 | Lowndes | 99/340 |
| 3,512,515 | 5/1970 | Megee | 126/25 AA |
| 3,657,996 | 4/1972 | Thompson | 126/25 AA |
| 4,129,111 | 12/1978 | Lehtovaara | 126/25 AA |
| 4,165,731 | 8/1979 | Lehtovaara | 125/25 AA |
| 4,270,444 | 6/1981 | Geissmann | 99/421 V |
| 4,438,684 | 3/1984 | Geissmann | 99/421 V |
| 4,469,019 | 9/1984 | Baer | 126/41 B |
| 4,932,391 | 6/1990 | Bierdeman | 126/30 |

*Primary Examiner*—Carl D. Price
*Attorney, Agent, or Firm*—Jim Leary; Carol Titus

[57] ABSTRACT

A retro-fit barbecue grill grid gear drive assembly (36) is provided for attaching to a prior art barbecue stand (20) comprises an electric 110V gear drive motor (48) or 12V reversible gear drive motor (118) attached to a heat-sink perforated plate (58 or 124) and protected in a housing (62). Housing extension pipe (65) is fitted into hole (44) made in fire bowl (22). Motor turns a drive shaft (54) and a clamp type drive head (56), or other drive head (90) or (108) and a grill grid (30) at about 1 RPM. Grid (30) can be fully loaded with food, lid (26) replaced until food is cooked to perfection.

6 Claims, 7 Drawing Sheets

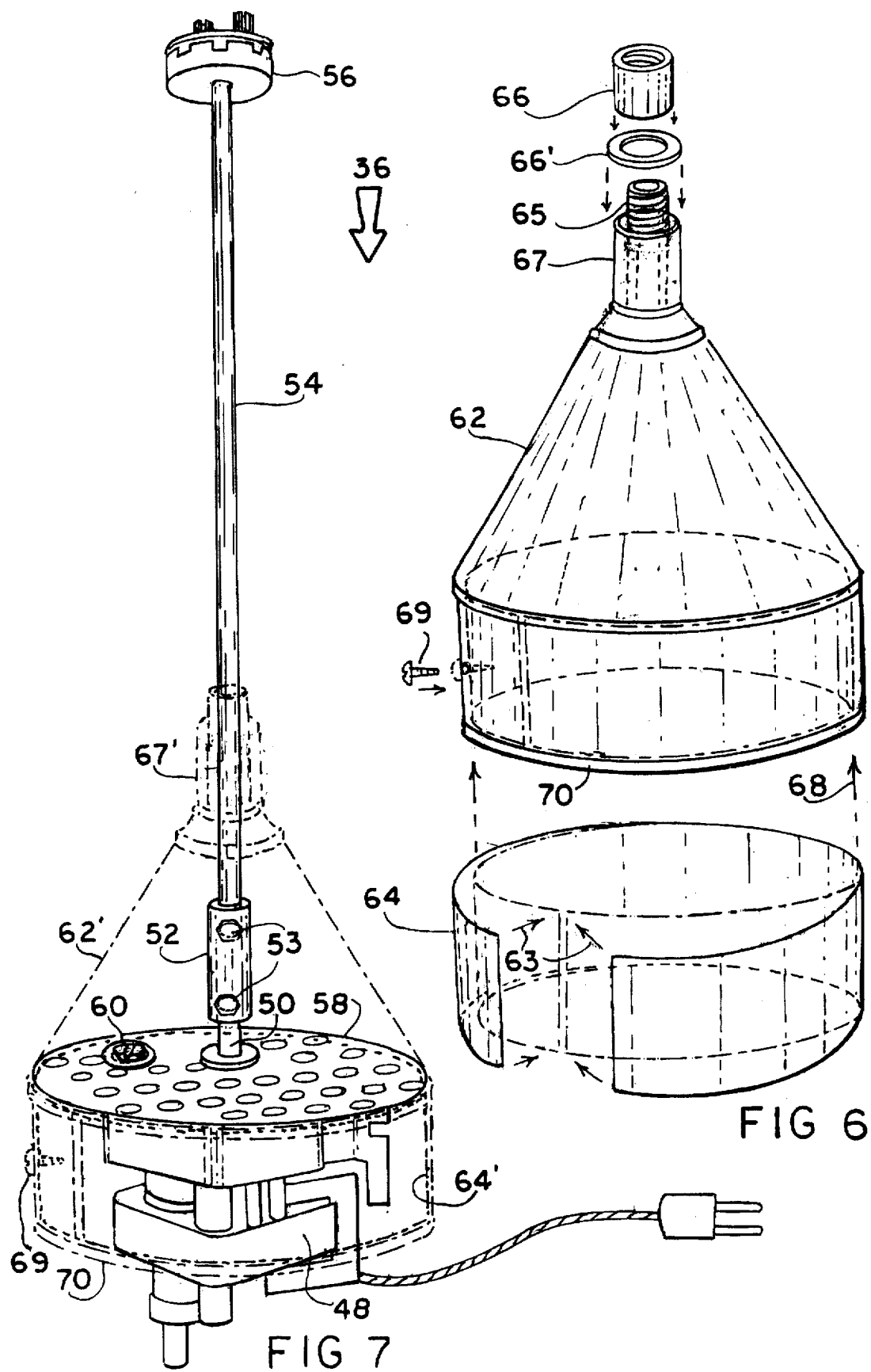

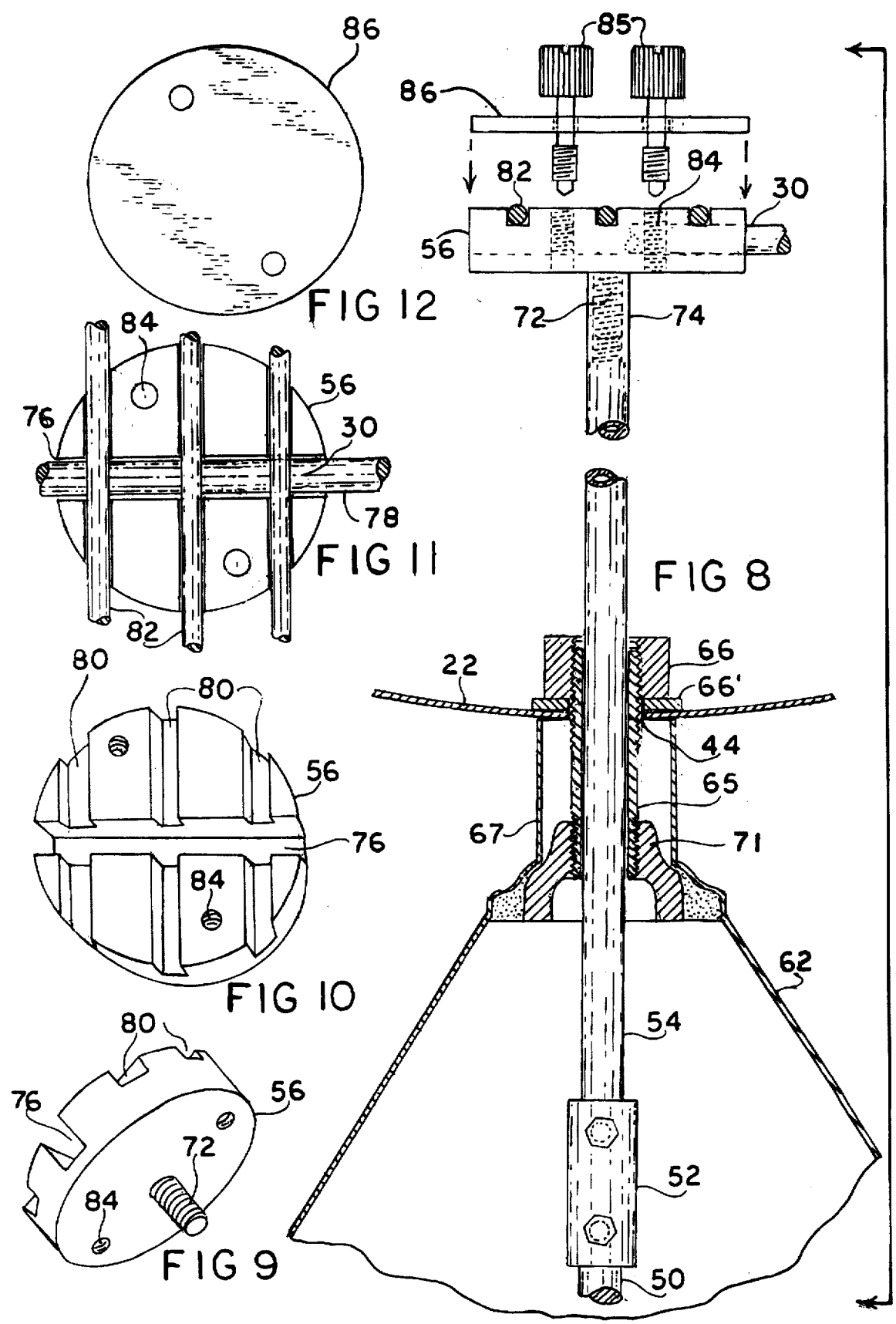

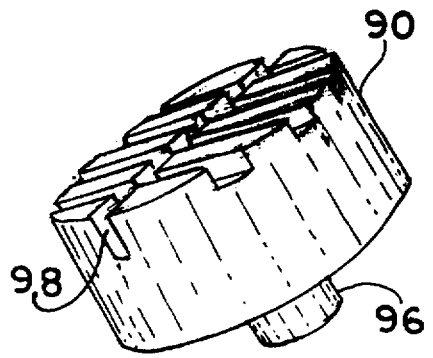
FIG 15
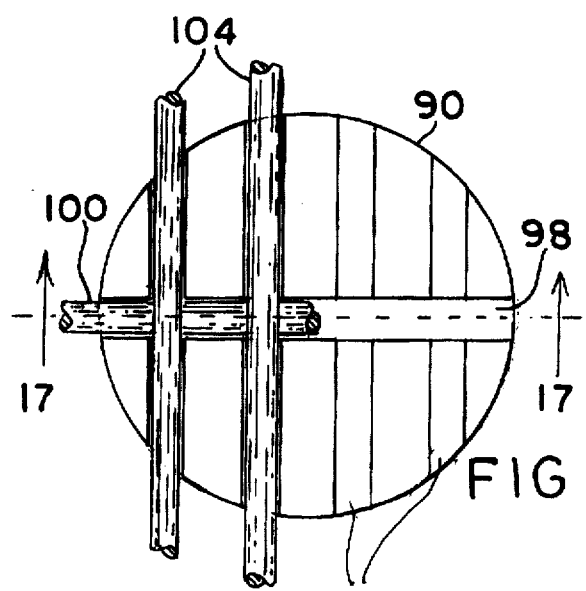
FIG 16
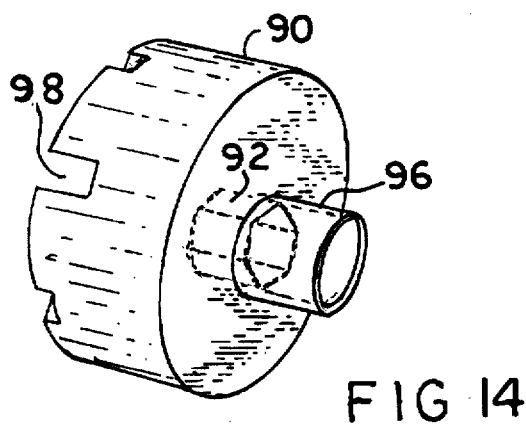
FIG 14
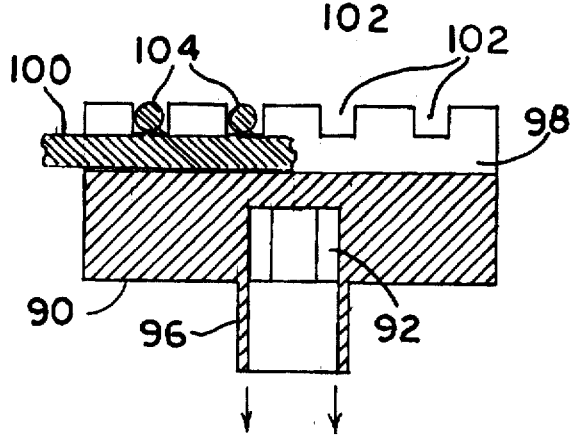
FIG 17
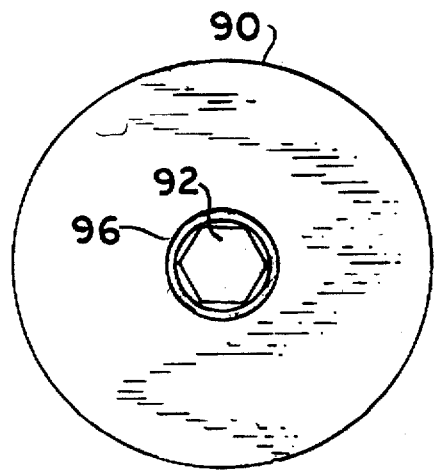
FIG 13
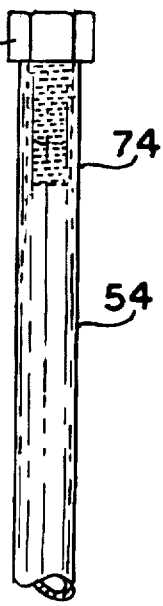

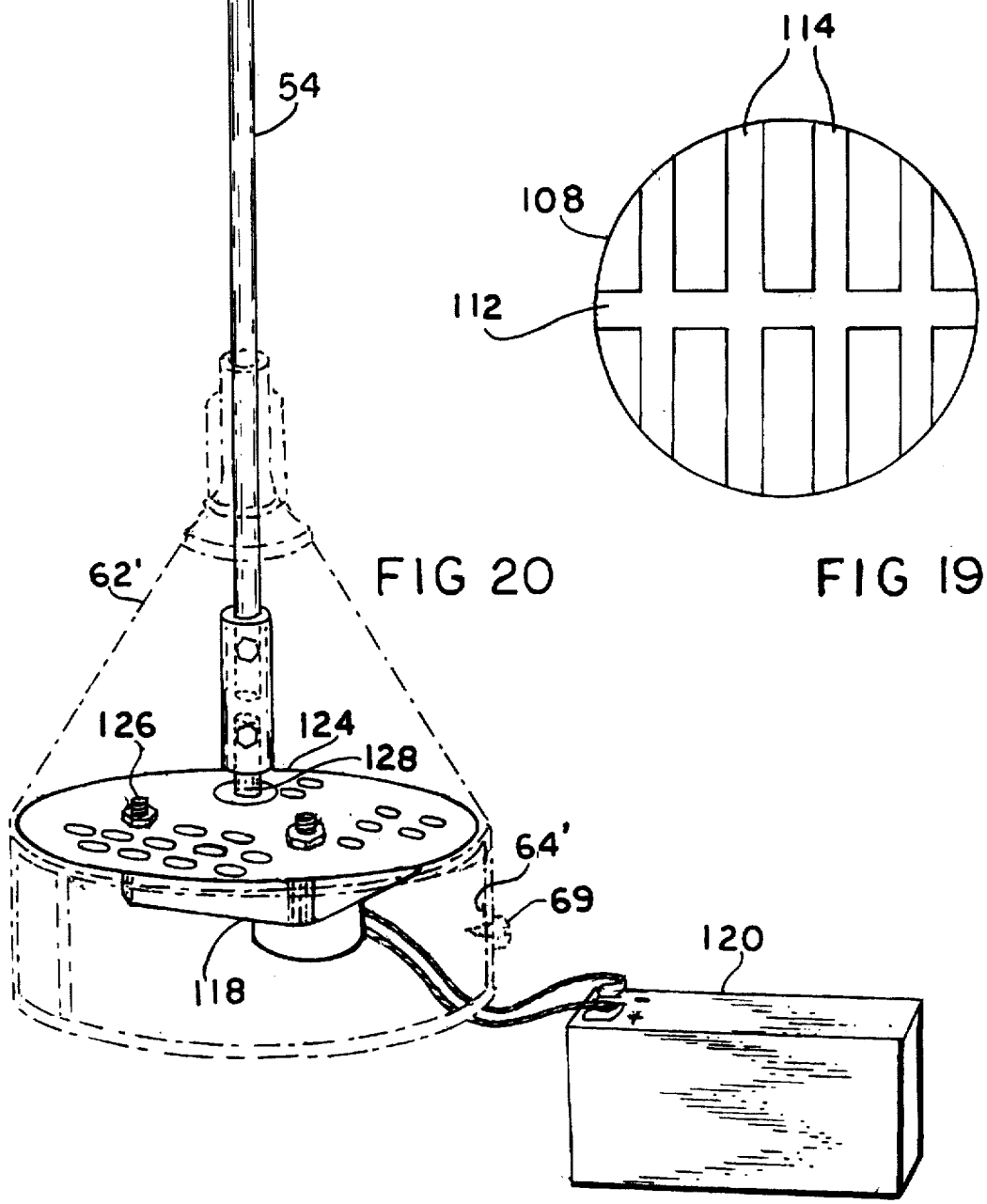

RETRO-FIT BARBECUE GRILL DRIVE

FIELD OF INVENTION

The present invention relates generally to outdoor cooking appliances and more particularly to an inexpensive grill drive assembly which can be quickly and easily retrofitted onto common barbecues presently sold without a motor drive means for rotating the grill grid during cooking. The present invention also allows for a full capacity load of food to be placed on the grill grid, and to afford even cooking without the need for vertical adjustment of the grill grid, or turning the food over during cooking, or continual monitoring by the cook.

BACKGROUND—FIELD OF PRIOR ART

In the past many attempts have been made to control the heat, rotate the grill, and provide for the even cooking on both sides of all pieces of food while barbecuing. Controlling the heat was typically attempted by raising or lowering the grill to reduce or increase the heat. Rotation of the grill plate was done either by hand or by motor. Even and thorough cooking was sought by frequent turning over of individual pieces of food according to their appearance of doneness.

Such methods relied heavily on guess work, requiring the nearly continuous attention of the cook to monitor progress. Even so, results still tended to be uneven, with some pieces of food being underdone, others overdone, and some burnt on the outside yet underdone within. To allow the cook to monitor progress, the barbecue lid would either be set aside unused or else lifted at very frequent intervals. Much of the heat generated by the burning fuel therefore escaped unused instead of accumulating under the lid and assuring that the food would be cooked through.

In order to partially overcome these problems, grill manufacturers usually suggest a so-called "indirect method" of barbecuing, consisting of stacking the coals around the perimeter of the fire grid and then placing the food in the center of the cooking grid. The drawback of this method is that the portion of the grill actually used for food is reduced by up to two-thirds, with the result that less food can be cooked at once and the number of people who can be served together is reduced in proportion.

Other inventions have attempted to compensate for the heat loss caused by keeping the cover off and/or the space loss caused by the indirect method. One attempted solution consists of lowering the grill closer to the heat source or fuel bed in order to speed up cooking; however, bringing the food closer to the heat carries the risk of burning the surfaces of the food before the insides are cooked through. Results also tend to be unpredictable, differing from time to time or cook to cook or the heat or windiness of the day.

Steadily turning the grill tends to provide a far more even distribution of heat to the various pieces of food, so efforts have been made to provide a motor drive to provide rotation. U.S. Pat. Nos. 3,298,301 and 3,033,189 show a variety of barbecue grills in which the motor used to turn the barbecue spit is also used to rotate the cooking grill. In both cases, however, the drive mechanism used to rotate the grill is relatively complex and requires numerous special parts, thus adding to the cost of production and increasing the susceptibility to breakdown.

Ritva M. Lehtovaara in U.S. Pat. No. 4,129,111 shows a barbecue with a motor driven horizontal grid above a fuel bed, and also features a rising and lowering grill grid. This device is extremely complex and subject to malfunction. The present applicant sees no need for raising and lowering of the grill grid in order to obtain gourmet cooking results. Also, Lehtovaara's device is not readily retro-fittable to barbecues presently available on the market.

In U.S. Pat. No. 4,165,731, Lehtovaara shows another approach to rotating a grill, by using a flexible drive means connected to the top of the grill grid, as shown. This device also features a means for raising and lowering the rotating grill grid, which the present applicant believes is unnecessary. This drive means is also complex and expensive to manufacture and cannot be retrofitted easily onto available barbecue stands.

Helen Baer in U.S. Pat. No. 4,469,019 shows a barbecue which cannot be retrofitted to another barbecue stand, due to the many specialized fittings, the special mechanism featured to raise and lower the grill grid, and the need to change the position of the drive motor for different cooking applications.

Bierdman in U.S. Pat. No. 4,932,391 shows a motor driven support arm which acts as a spit and rotates vertically. It cannot be retro-fit onto the barbecue stands presently available on the market.

There is another problem with the motor driven grill grids or spits typically used in prior art barbecues. If the barbecue is left uncovered, the motor is unprotected from the elements; and even if the user replaces the cover, wind might still blow it away, allowing rain and/or moisture to penetrate and damage the drive mechanism.

OBJECTS AND ADVANTAGES

Accordingly, one object and advantage of the present invention is to provide an inexpensive, simple, yet extremely functional retro-fit barbecue grill drive for attaching to a common prior-art barbecue stand Another object and advantage is to provide a retro-fit grill drive which requires only one hole to be drilled in a barbecue housing, plus a few minutes by a relatively unskilled person to install the drive mechanism. A further object and advantage is to provide a drive mechanism in which the drive motor is protected against heat and/or ashes from the barbecue fire and also from rain if left uncovered during wet weather.

Still another object and advantage of the present invention is to provide a barbecue which can be loaded with food, and which becomes deliciously cooked without requiring the constant attention by a cook. Another object and advantage is to provide a power driven barbecue which cooks the food on both bottom and top sides simultaneously, overcoming the need to turn the food over. A still further object is to provide a power driven grill on which such varied foods as chicken, steak, chops, etc. can be simply and simultaneously cooked without overdoing some and underdoing others.

3

Figure 3:
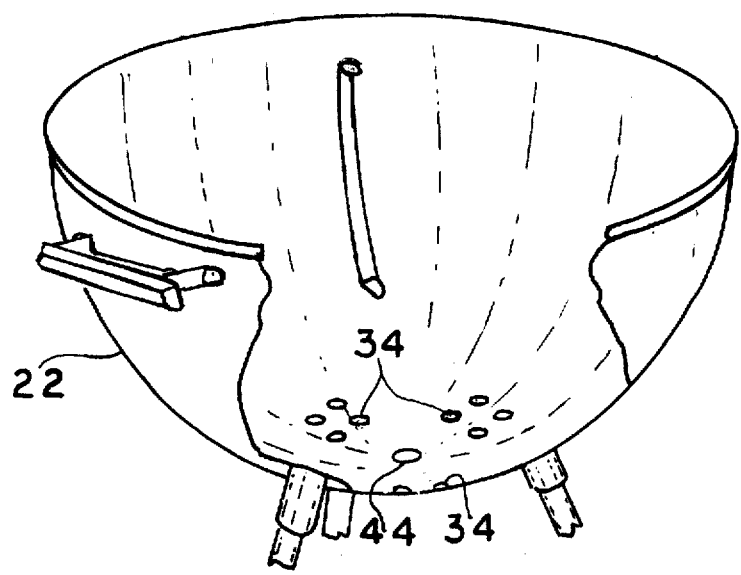
FIG. 3 is a part cut-away perspective view of the fire bowl of prior art barbecue stand of FIG. 1.
Figure 4:
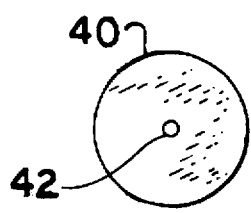
FIG. 4 is a top view of a disk-shaped template with a center hole for marking the position of a hole to be drilled in the base of the fire bowl into which the present invention is fitted.
Figure 5:
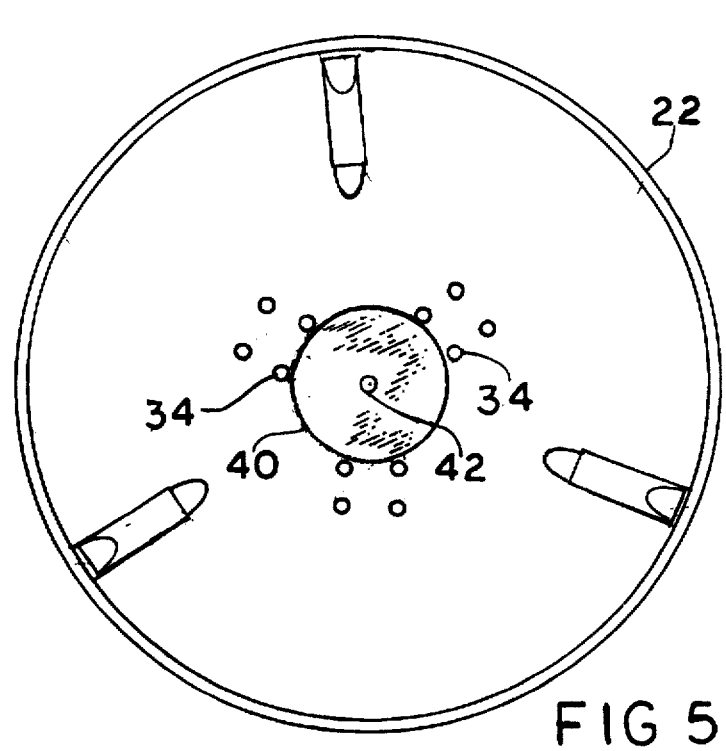

FIG. 5 is a top view of prior-art barbecue fire bowl shown in FIG. 3, with template of FIG. 4 shown in position for marking.

FIG. 6 is a perspective view of the drive motor housing and motor retaining spring locking band of the present invention.

FIG. 7 is an exposed perspective view of the drive motor, drive motor mounting plate, coupling, drive shaft and drive head with the drive motor housing and locking band of FIG. 6 shown by a projected line 62' and 64' respectively.

FIG. 8 is a part sectional, part side view of a portion of the housing and drive shaft of FIGS. 6 and 7, with the drive head shown in an exploded view.

FIGS. 9 and 10, are perspective bottom and top views respectively of a first embodiment drive head used in the invention.

FIG. 11 is a top view of the drive head shown in FIGS. 9 and 10, with grill grid bars shown in position.

FIG. 12 is a top view of a grill grid retaining plate used with the drive head of FIGS. 9-11 and 12.

FIG. 13 is a bottom view of a second drive head embodiment having a hexagonal drive depression.

FIG. 14 is a perspective bottom and side view of the drive head of FIG. 13 with an extended sleeve.

FIG. 15 is an elevated perspective side view of the drive head of FIGS. 13 and 14.

FIG. 16 is a top view of the drive head of FIGS. 13-15 with part of the grill bars shown in the grooves. FIG. 17 is a sectional view taken along broken line 17—17 of FIG. 16, with a part exploded perspective view of the top end of the drive shaft with a hexagonal head.

FIGS. 18 and 19 are side and top views respectively of a third drive head embodiment in which grill bars will be permanently brazed into the slots of a drive head.

FIG. 20 is a detailed view of a second barbecue grill drive embodiment having a reversible drive head motor operated by electric power from a rechargeable low voltage battery.

DETAILED DESCRIPTION OF THE PREFERRED EMBODIMENT—(FIGS 1–7)

Referring to the drawings, a barbecue stand designated by the reference numeral 20 (FIG. 1) shows a prior-art stand which is widely used and is readily available on the market. The barbecue stand comprises: a fire bowl 22 supported by three legs 24; a lid 26 with adjustable ventilator 28; a grill grid 30 which can be rotated by hand; and a fire grid 32 for supporting a charcoal fire. In addition, the fire bowl has an array of air inlet holes 34, which also serve to allow ash from the fire to fall into an ash tray (not shown) underneath.

Air inlet holes 34 at the bottom of fire bowl 22 are arranged concentrically around the center of the base and allow an even distribution of incoming air to enter beneath the burning charcoal.

Figure 1:
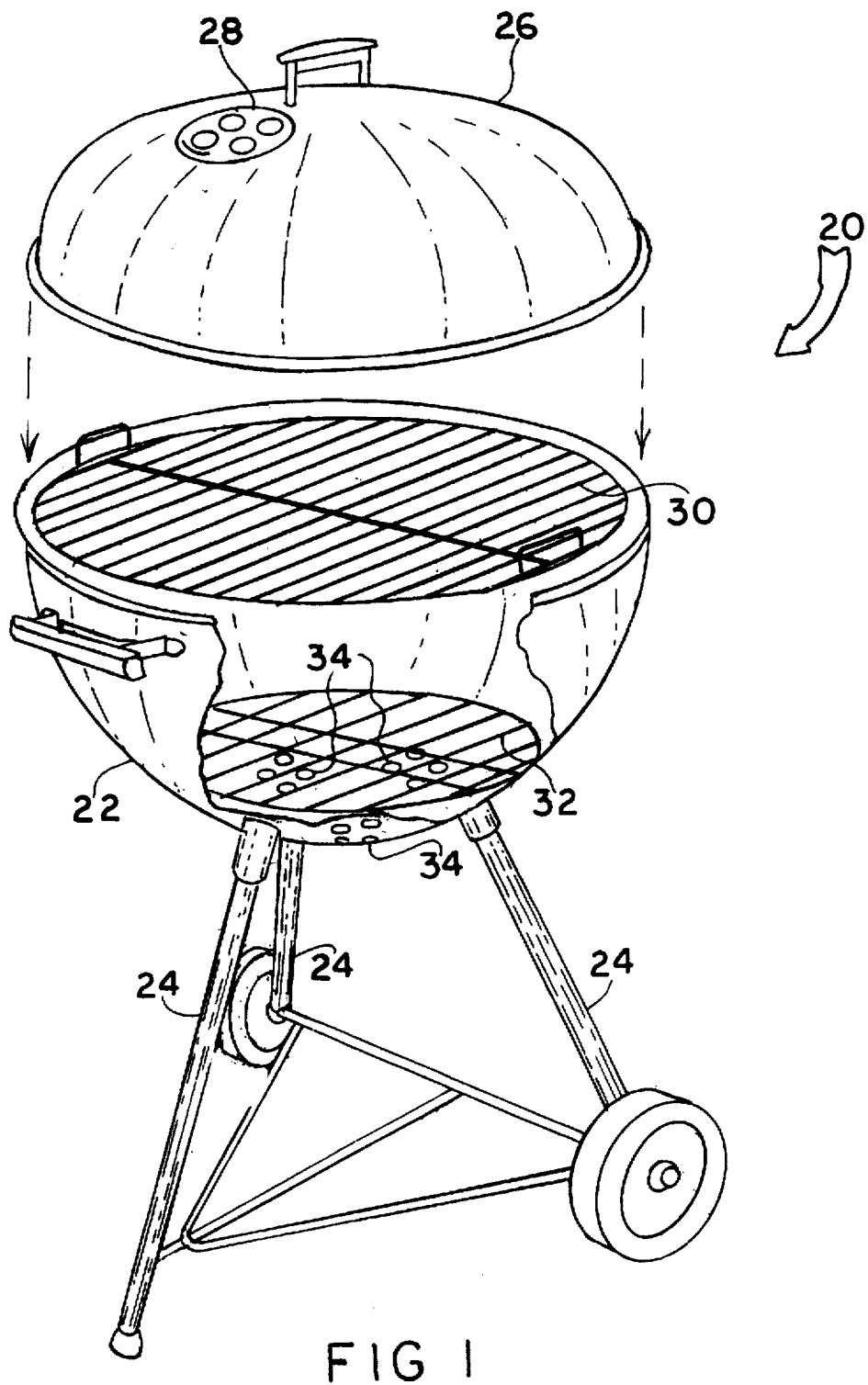
FIG. 1 is a perspective part cut-away view of a prior-art barbecue stand which is widely used and is readily available on the market.
Figure 2:
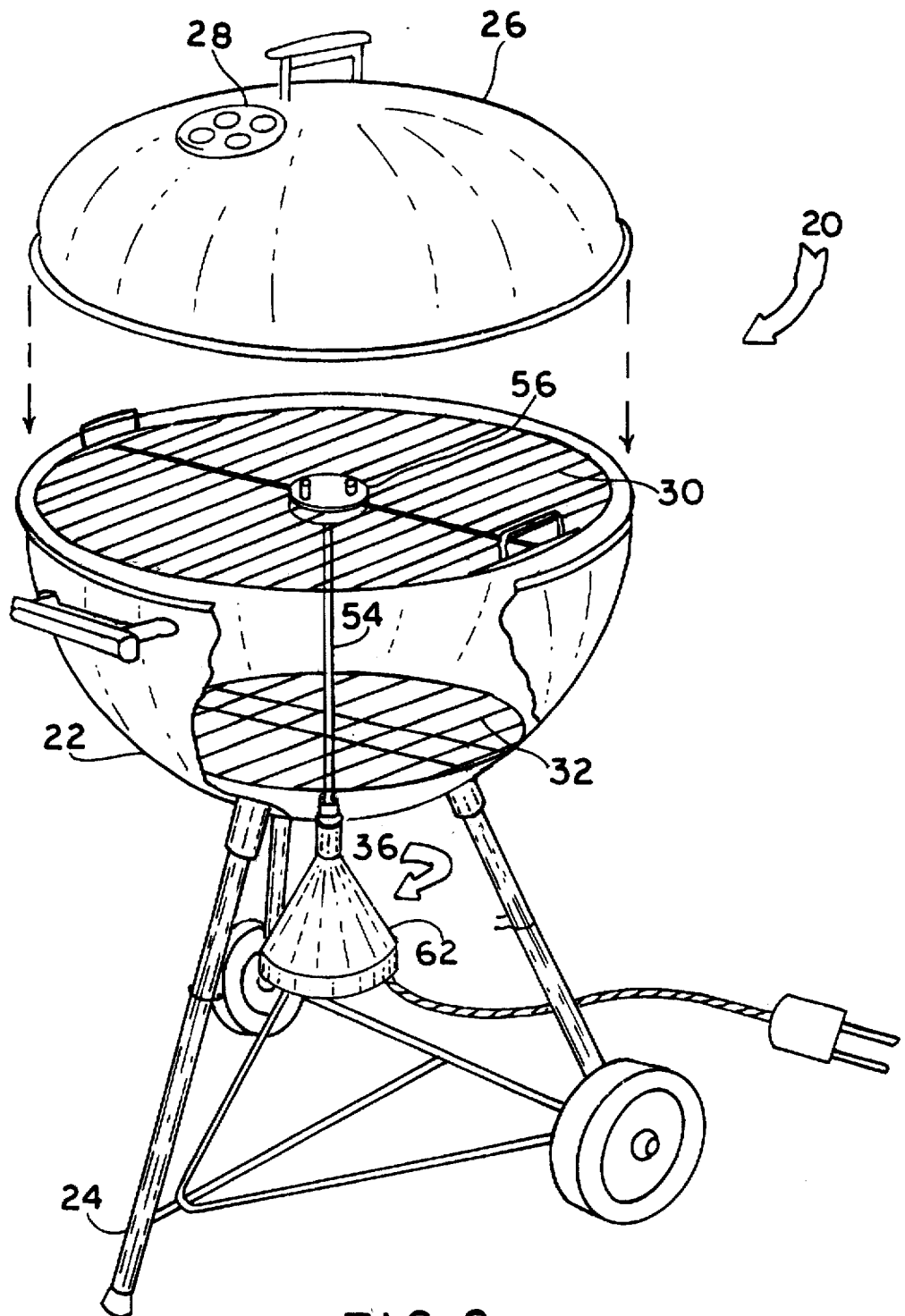
FIG. 2 is a perspective, part cut-away view of the prior-art barbecue stand of FIG. 1, fitted with a retro-fit motor, motor housing, drive shaft and drive head of the present invention.

Referring now to FIG. 2, there is shown a first embodiment of a retro-fit barbecue grill drive of the present invention designated in its entirety by the numeral 36, fitted to prior-art barbecue stand 20 (FIGS. 1 and 2). In order to attach retro-fit grill drive 36 into fire bowl 22, it is necessary to first drill a single 12.5 mm (0.5") hole 44 (FIG. 3) through the center of the bottom of fire bowl 20. The procedure for marking and drilling hole 44 is described immediately below.

MARKING POSITION OF A 0.5" DIA. HOLE IN BASE OF FIRE THE BOWL—FIGS. 3–5

FIG. 3 shows a perspective part cut-away view of fire bowl 22, with fire grate 32 and barbecue grill grid 30

4 removed for clarity. Air inlet holes 34 are clearly shown concentrically placed around the center of the bottom of fire bowl 20 where hole 44 is to be drilled. A circular template 40 (FIG. 4) is provided for marking the exact center of this hole. Template 40 is sized to fit exactly between holes 34 (FIG. 5), and has a central guide hole 42 through which a pencil or center punch can be inserted to mark the position of hole 44 prior to drilling. A hand held electric drill and a 12.5 mm (0.5") drill (not shown) can be used to drill hole 44. Hole 44 is the only modification required on the fire bowl in order to fit barbecue grill drive mechanism 36 as shown in FIG. 2. Hole 44 does not impair the original performance of the prior art barbecue stand should the grill drive mechanism be removed at a later date.

A 100 mm (4") diameter template 40 is provided with the present invention to mark small model barbecue fire bowls. Larger templates (not shown) are provided for larger fire bowls.

RETRO—FIT BARBECUE GRILL DRIVE MECHANISM—(FIGS. 6–8)

FIGS. 6–8, shows in detail a first embodiment of the retro-fit barbecue grill drive 36, shown in FIG. 2. FIG. 6 shows an inverted funnel or cone-shaped housing 62 and a spring locking band 64 which is fitted into housing 62 to retain a gear drive motor 48. Housing 62 has base about 159 mm (6.25") diameter, and about 165 mm high. The cone-shaped housing 62 tapers to about 50 mm (2") dia.

The top end of housing 62 has an extended threaded ⅜" water pipe 65, about 35 mm (1.5") long and 12.5 mm (0.5") OD, which fits into hole 44 (FIG. 3) in fire bowl 22, when retro-fit assembly 36 is mounted.

Pipe 65 is threaded at its lower end and is screwed into a reducing bushing 71, which has been brazed into funnel-shaped housing 62, shown in FIG. 8. The ⅜" ID of pipe 65 serves as a guide bearing for stainless steel drive shaft 54. Shaft 54 preferably is 8 mm (5⁄16") stainless steel tubing.

In addition, pipe 65 is surrounded by a tubular member 67, which is about 25 mm (1") OD and 25 mm (1") long and is an integral part of housing 62. Tubular member 67 forms a rigid spacer to distance housing 62 from fire bowl 22 and to abut against the fire bowl when housing 62 is mounted.

FIG. 7 shows in detail retro-fit drive assembly 36 comprising an electric gear motor 48, motor shaft 50, shaft coupling 52, drive shaft 54, drive head 56, and a perforated mounting plate 58. Mounting plate 58 is attached to motor 48 with 4 screws (one only shown), and is perforated with numerous holes which act as a 'heat-sink' to dissipate heat from the fire bowl, thereby protecting gear motor 48 from excessive heat from fire bowl 22.

SEQUENCE OF ASSEMBLY—(FIGS. 6–8)

1) Electric gear drive motor 48 is first attached to perforated mounting plate 58 by four screws 60; 2) Drive shaft 54 is attached to motor shaft 50 with coupling 52 and secured with two hexagon head set screws 53; 3) Drive head 56 is unscrewed from top end of drive shaft 54. 4) The top end of drive shaft 54 is then fitted upward into inverted cone-shaped housing 62 and through pipe 65 of FIG. 6 as far as it will go, (shown by projected line 62' (FIG. 7). 5) Motor 48 is now retained in funnel 62 by first compressing spring locking band 64 in the direction of arrows 63, then inserting band 64 upwards in the direction of arrow 68 into funnel 62 as far as it will go. 6) When released, band 64 will expand and lock behind rolled edge 70 of housing 62, (also shown by projected line 64° FIG. 7). 7) Spring band is finally secured by the addition of about 5 sheet metal screws 69 which are inserted through the wall of housing 62 into band 64, (one screw shown in FIGS. 6 and 7). The purpose served by spring locking band 64 is to abut against mounting plate 58 thus safely securing motor 48, coupling 52, and lower end of drive shaft 54 within housing 62.

The retro-fit barbecue grill drive assembly of the present invention is now ready for fitting to fire bowl 22 of prior-art barbecue stand 20. Drive shaft 54 is directed upwards through drilled hole 44 in the base of fire bowl 20, until cylindrical member 67 abuts against fire bowl 22, (FIGS. 3 and 8). Washer 66' is then fitted over pipe 65 and threaded sleeve 66 (FIGS. 6 and 8) screwed onto pipe 65 and tightened to retain the retrofit assembly 36 securely in place as shown in FIG. 8. Preferably, sleeve 66 is a common black pipe union having a ⅜ pipe thread, and can be tightened with a pipe wrench. Fire grate 32 can now be replaced in the fire bowl, then drive head 56 screwed onto top end 74 of drive shaft 54, which has been internally threaded to receive stud 72 (FIGS. 8 and 9). Grill grid 30 is then fitted. Clamp plate 86 and screws 85 tightened to secure grill grid to drive head. Clamp-type drive head is described in detail immediately below.

CLAMP TYPE DRIVE HEAD—(FIGS. 8–12)

FIGS. 9 and 10 show perspective views of the bottom and top faces of clamp-type drive head 56, used for securing grill grid 30 to the top end of drive shaft 54. Head 56 comprises: a machined or cast metal base having a threaded ¼"×20NC stud 72, protruding about 12.5 mm (0.5") from the center of its bottom face. Threaded stud 72 can be screwed into the internally threaded top end 74 of drive shaft 54 (FIG. 8).

The top face of head 56 (FIGS. 10 and 11) has one deep cut groove 76, about 7.5 mm (0.308") wide and 9 mm (0.365) deep, for receiving a central support bar 78 of grid 30, and three shallow transversely cut grooves 80, about 4.8 mm wide (0.188") and 4 mm (0.1575") deep for receiving three cross bars 82 (FIG. 11) of grid 30. In order to clamp bars 78 and 82 of grill grid 30 into their respective grooves, a clamping plate 86 (FIG. 12) is clamped down by two thumb screws 85 which screw into drive head 56 as shown in FIG. 8. Each 10×24NC thumb screw has a knurled and slotted head, is about 20 mm (0.75") long and passes through holes in clamping plate 86 into threaded holes 84 in drive head 56. The knurled heads and screw driver slots provide easy means for removing grill grid 30 for replenishing charcoal. The above screw lengths are approximate. Any suitable size and thread screw can be used.

SECOND DRIVE HEAD EMBODIMENT—(FIGS 13–17)

The present embodiment, although more costly to manufacture, is designed to achieve the advantages most desired in barbecue cooking. These include: 1) easy removal and/or replacement of the grill grid at any time, whether a fire is going or not; 2) grill grid stays level and turns smoothly, even when unevenly loaded; 3) the drive head mechanism is positive and does not loosen, slip or jam; 4) drive head can be easily lined-up on the drive shaft when replacing a grill grid and drive head. This type of drive head, and other types shown in this application can be used with large or small size grill grids providing the grooves in the head are machined to suit the grid bar spacing and pattern.

FIG. 13 shows a bottom view of a 56 mm (2.25") diameter×25 mm (1") thick metal drive head 90, made by machining or casting. It has a hexagonal depression or indentation 92 about 10 mm (0.375") deep in its base and is sized to accept the hexagon head of a ¼"×20 NC screw 94, shown in FIG. 8. Screw 94 is screwed into a matching thread in the top end 74 of drive shaft 54. Drive shaft 54 is driven in a counter-clockwise direction which is consistent with tightening hexagon headed screw 94 in drive shaft 54 when motor is operating. Alternatively, screw 94 can be left-hand threaded and driven in a clockwise direction, which would be consistent with tightening the screw.

Drive head 90 further comprises a guide sleeve 96 measuring about 12.5 mm (0.5") ID and about 17 mm (0.6250") OD and 12.5 mm (0.5") long, which is machined coaxially with and around hexagon indentation 92. Sleeve 96 serves as an "easy-to-locate-and-slip-over" guide when replacing drive head and grill grid onto hexagon head 94. The ease of replacing the head and grill is especially convenient and appreciated when a hot charcoal fire is present, not only in saving time and discomfort, but almost eliminating a chance of getting burned.

On the top side, FIGS. 15–17 show one deep groove 98 about 9.5 mm (0.3750) deep and 4.8 mm (0.188") wide for receiving main support cross bar 100 of the grill grid, and four shallow transversely placed grooves 102 each about 4.8 mm (0.188") deep and 4.8 mm (0.188") wide for receiving four transverse bars 104. FIG. 16 shows (in part) grill grid bars permanently brazed or welded. Alternatively bars 78 and 82 can be removably clamped as shown in FIG. 8.

THIRD DRIVE HEAD EMBODIMENT—(FIGS. 18–20)

FIGS. 18 and 19 show a side and a top view respectively of a third embodiment of a grill drive head, which can be used with the present retro-fit barbecue grill drive invention. It is included in the present application for its simplicity of construction and economy of production cost.

Accordingly, FIGS. 18 and 19 show a metal drive head 108 which is about 12.5 mm (0.5") thick and 56 mm (2.25") in diameter. It has a ¼"×20NC threaded stud 110 attached concentrically to its base, protruding about 12.5 mm (0.5"). A deep groove 112 is cut about 4.8 mm (0.188") wide and 9.3 mm (0.365") deep across its top face. In addition, four shallow grooves 114 are cut across its top face transversely to groove 112; these are each about 4.8 mm (0.188") wide and 4.8 mm (0.188") deep and machined 8 mm (0.315") apart. The groove pattern and dimensions of grill drive head 108 are cut to accept the grid bars of a 567 mm (22.5") diameter prior-art grill grid which can be welded or brazed into grooves 112 and 114.

SECOND DRIVE MOTOR EMBODIMENT— (FIGS. 20)

FIG. 20 shows a 12 volt DC reversible gear drive motor 118 powered with a rechargeable 12 volt battery 120. Battery 120 will operate motor 118 for 4 hours of continuous operation. Direction of operation of drive shaft 122 can be reversed by switching positive and negative leads to electric supply battery 120. An alternative electric supply can be utilized by connecting motor 118 leads to a 12 volt car battery when convenient or to an electric supply from a suitable solar cell panels.

Motor 118 has a gear ratio of 1634:1 and has an input motor HP of 1/900. Motor 118 is attached to perforated cooling plate 124 by four studs 126 (two only shown). Drive shaft 128 speed is about 1 RPM. The assembly and fitting of the second drive motor embodiment (FIG. 20), can be fitted to a prior-art barbecue stand in the same manner as the first drive motor embodiment shown in FIG. 2.

Also, all three drive head embodiments can be used with either drive motor embodiments; however, drive shafts lengths may vary according to barbecue size, drive head thickness and grill grid bar pattern.

MATERIALS

The following materials for the various components are preferred for the reasons given below; however, any other suitable alternative material can be substituted. Inverted cone-shaped housing 62 is made of 31 gauge half galvanized steel, for its resistance to corrosion and ease of manufacture; spring locking band 64 preferably is made from galvanized steel about 0.8 mm (0.0312") thick, for its elasticity and resistance to corrosion; drive shaft 54 from 8 mm (0.316") stainless steel tubing for its strength, and resistance to damage by fire and heat; drive heads from steel or cast iron, which excel as materials for casting and machining; perforated plate 58 and 124 from galvanized steel for its heat transfer and dissipation properties.

OPERATION

For easy, consistent results, the present invention rotates the grill grid at one revolution per minute. The user simply starts the fire, spreads the coals evenly, replaces the drive head/grill grid assembly, and plugs in the motor. Food can then be arranged across the entire grill grid, separating the pieces only just enough to allow full convectional and even heating. The barbecue lid is then placed over the food and left undisturbed for the estimated cooking time, at which time the food can be checked for doneness.

Leaving the lid on reduces both fuel consumption and cooking times. It also allows the food to become well browned on the outside while remaining juicy and moist yet consistently cooked within. If, for aesthetic reasons, the cook wants a seared look and the impression of grill marks on both sides of the food, then the lid can be lifted and the food turned half-way through the cooking process, and the lid replaced. Cooking times will differ for different foods, but the appropriate time for each kind is quickly learned.

The combined effects of slow rotation and the lid being left in place has been proven by the inventor to produce an outstandingly succulent and consistent result with a drastic reduction of effort.

SUMMARY, RAMIFICATIONS, AND SCOPE

Thus, the reader will see that I have provided a retro-fit barbecue grill drive which is easy to install, requiring only one 0.5" hole to be drilled in the base of common barbecue fire bowls, and which does not damage or alter the function of the unit if the retro-fit drive is later removed. I have provided a retro-fit grill drive which is inexpensive, and which can be operated either by normal electric home supply, or easily changed to operate from a car battery, or taken to a beach or picnic spot and operated from a rechargeable dry battery. I have provided a retro-fit barbecue grill drive which does away with the need to raise and/or lower the height of the grill grid to regulate heat or to turn the food over in order to cook the top of the food being cooked. Above all, I have provided a retro-fit grill drive which will cook a full load of food, such as steaks, chops, fish, chicken pieces, sausages or the like to perfection. I have provided a means to house and protect a drive motor from ash, heat, and rain.

While the above description contains many specificities, the reader should not construe these as limitations on the scope of the invention, but merely as exemplifications of preferred embodiments thereof. Those skilled in the art will envision that many other possible variations are within its scope. For example, skilled artisans will readily be able to change the dimensions and shapes of the various embodiments, such as by making the components from different metals or materials than those preferred, by changing the shapes and size of various components, by changing the means of cooking heat from charcoal to say coke, or gas, or electricity, or wood, or solar energy. It is even possible to replace the electric motor with other means of power.

Accordingly, the reader is requested to determine the scope of the invention by the appended claims and their legal equivalents, and not by the examples which have been given.

I claim:

1. A drive apparatus for a barbecue grill of the type having a fire bowl and a grill grid within the fire bowl, said drive apparatus comprising:

a gear reduction electric drive motor positioned beneath the fire bowl of the barbecue grill, a protective housing enclosing said drive motor, said protective housing having means for attaching said protective housing to a lower surface of the fire bowl of the barbecue grill, said protective housing having a conical upper surface for shedding ashes, water and debris which may fall on said protective housing from within the fire bowl of the barbecue grill, a substantially vertically oriented drive shaft extending from said drive motor beneath the fire bowl to the grill grid within the fire bowl, said drive shaft passing through a hole formed in a lower surface of the fire bowl of the barbecue grill, and coupling means for coupling said drive shaft to the grill grid comprising a drive head having a deep central groove formed therein for engaging a first bar of the grill grid and a plurality of shallower transverse grooves for engaging a plurality of transverse bars of the grill grid and a clamping plate for clamping the bars of the grill grid within the grooves of said drive head, a removable attachment means for removably attaching said clamping plate to said drive head, whereby the grill grid of the barbecue grill may be readily detached from said drive head, and a removably attachable torque transmitting coupling means for removably attaching said drive head to said drive shaft, whereby said drive head and the grill grid of the barbecue grill may be readily detached from said drive shaft of said drive apparatus as a unit.

2. The drive apparatus for a barbecue grill of claim 1 wherein said removably attachable torque transmitting coupling means comprises a hex head on an upper end of said drive shaft and a corresponding hex socket on said drive head which engages said hex head.

3. The drive apparatus for a barbecue grill of claim 2 wherein said drive head further comprises a guide sleeve coaxially aligned with said hex socket of said drive head for guiding said hex head into said hex socket.

4. The drive apparatus for a barbecue grill of claim 1 wherein said removably attachable torque transmitting coupling means comprises a threaded stud extending from said drive head and a correspondingly threaded socket on an upper end of said drive shaft.

5. The drive apparatus for a barbecue grill of claim 1 further comprising a battery, said battery powering said drive motor.

6. The drive apparatus for a barbecue grill of claim 5 wherein said battery is rechargeable.

* * * * *